(12) United States Patent
Xiao et al.

(10) Patent No.: US 10,780,504 B2
(45) Date of Patent: Sep. 22, 2020

(54) POWDER RECYCLING SYSTEM AND CONTINUOUS LOSS IN WEIGHT MODULE APPLIED THERETO

(71) Applicant: National Chung-Shan Institute of Science and Technology, Taoyuan (TW)

(72) Inventors: Yi-Lun Xiao, Taoyuan (TW); Li-Tsung Sheng, Taoyuan (TW); Shu-San Hsiau, Taoyuan (TW); Kuo-Kuang Jen, Taoyuan (TW); Chih-Peng Chen, Taoyuan (TW); Po-Shen Lin, Taoyuan (TW); Chung-Chun Huang, Taoyuan (TW)

(73) Assignee: NATIONAL CHUNG-SHAN INSTITUTE OF SCIENCE AND TECHNOLOGY, Taoyuan (TW)

( * ) Notice: Subject to any disclaimer, the term of this patent is extended or adjusted under 35 U.S.C. 154(b) by 440 days.

(21) Appl. No.: 15/815,728

(22) Filed: Nov. 17, 2017

(65) Prior Publication Data
US 2019/0151954 A1 May 23, 2019

(51) Int. Cl.
| | |
|---|---|
| *B22F 8/00* | (2006.01) |
| *B22F 3/105* | (2006.01) |
| *B33Y 40/00* | (2020.01) |
| *B22F 9/00* | (2006.01) |
| *B22F 1/00* | (2006.01) |

(52) U.S. Cl.
CPC .............. *B22F 8/00* (2013.01); *B22F 3/1055* (2013.01); *B33Y 40/00* (2014.12); *B22F 1/0003* (2013.01); *B22F 2003/1059* (2013.01); *B22F 2009/001* (2013.01); *B22F 2999/00* (2013.01)

(58) Field of Classification Search
CPC .. B22F 8/00; B22F 3/1055; B22F 2003/1059; B22F 2999/00; B22F 2009/001; B22F 1/0003; B33Y 40/00
See application file for complete search history.

(56) References Cited

U.S. PATENT DOCUMENTS

| | | | |
|---|---|---|---|
| 2015/0298397 A1* | 10/2015 | Chen ...................... | B01D 36/00 209/12.2 |
| 2017/0028631 A1* | 2/2017 | Hyatt .................... | B05B 7/1468 |

(Continued)

*Primary Examiner* — Nahida Sultana
(74) *Attorney, Agent, or Firm* — Idea Intellectual Limited; Margaret A. Burke; Sam T. Yip

(57) ABSTRACT

A powder recycling system includes a supply tank, a continuous loss-in-weight module, a pneumatic module, a transfer channel, a recycle module, and a refilling tank. The supply tank accommodates recycling powder. The continuous loss-in-weight module includes a storage tank receiving the recycling powder from the supply tank and a rotary output pipe connected to the storage tank to output the recycling powder. The continuous loss-in-weight module controls the mass flow rate of the output of the recycling powder according to the weight change of the storage tank. The pneumatic module enables the recycling powder to float and move in the transfer channel. The recycle module is connected to the transfer channel to receive the recycling powder, sieves the recycling powder, provides virgin powder, and mixes the virgin powder with the recycling powder. The refilling tank is connected to the recycle module to receive the recycling powder and the virgin powder.

13 Claims, 5 Drawing Sheets

(56) References Cited

U.S. PATENT DOCUMENTS

2017/0259337 A1* 9/2017 Furukawa .............. B33Y 30/00
2017/0348657 A1* 12/2017 Mints ...................... E21B 33/13
2018/0326657 A1* 11/2018 Iwase ................... B29C 64/165
2019/0118475 A1* 4/2019 Chanclon ................ B22F 3/004

* cited by examiner

POWDER RECYCLING SYSTEM AND CONTINUOUS LOSS IN WEIGHT MODULE APPLIED THERETO

FIELD OF THE INVENTION

The present invention relates to a powder recycling system, and in particular, to a pneumatic powder recycling system.

BACKGROUND

Metal additive manufacturing, or referred to as metal 3D printing, is a process of forming a metal powder raw material into workpieces with various shapes by using a laser sintering technology, and drawing out the workpieces after completing laser sintering. During the process of metal additive manufacturing, only a part of the metal powder raw material is used and the remaining metal powder raw material is not sintered. If the metal powder raw material that is not sintered is directly discarded, the metal powder raw material will be wasted. In addition, the process of removing the metal powder raw material that is not sintered from a working platform also lowers the working efficiency. Therefore, after the laser sintering is completed, recycle of the metal powder raw material that is not sintered is one of keys to reduce the costs and improve the efficiency.

The metal powder raw material used for additive manufacturing is required to have high quality. For example, the roundness, the oxygen content, and the like of the metal powder raw material may greatly affect the property of a manufactured workpiece. Therefore, the metal powder raw material not only needs to have good plasticity, but also needs to meet conditions such as controllable granularity, high purity, components, subtilization, good fluidity, and high sphericity. Therefore, during the manufacturing process, a special apparatus is needed, and manufacturing costs will be higher. The metal powder raw material usually has a performance 15 to 50 times to that of conventional powder for metallurgy, and is a high-performance metal powder.

During a conventional additive manufacturing process, first, a feeding apparatus provides a metal powder raw material to a working platform, and powder laying and laser sintering are performed layer by layer by using a roller or a scraper. The foregoing steps are repeated until a workpiece is manufactured. The manufactured workpiece wrapped in the metal powder raw material is then drawn out. After collecting the remaining metal powder raw material that is not sintered, preparations are made for manufacturing a next workpiece.

During the foregoing process of performing powder pavement by using a roller or a scraper, powder is relatively poorly constrained. As a result, when laid, the powder may flow toward two sides of the working platform or may easily stack on a corner causing waste of powder.

Currently, recycling of remaining metal powder is usually performed by manual operation, in cooperation with some devices, or semi-automatically to collect the remaining metal powder. If an operation is incorrectly performed in a workplace, metal powder can be easily damaged during the process of collecting or transferring the powder. In addition, a metal powder raw material may form dust in the air. The dust may directly harm respiratory tract health of onsite working personnel, and some combustible metal powder may even cause dust explosion. Particularly, existing aerospace-level additive manufacturing systems gradually develop towards large-scale mechanical equipment. In conventional additive manufacturing, powder processing needs participation of operators. However, with the current trend of large-scale additive manufacturing systems, powder cannot be removed or recycled only by manual operation.

During the process of transferring metal powder, a mechanical apparatus such as a screw conveyor is often used to transfer the metal powder or mix the metal powder. A transferring mechanism of the mechanical apparatus may extrude or rub the metal powder causing deformation or attrition of the metal powder and further lowers quality properties such as the roundness of the powder.

SUMMARY OF THE INVENTION

To resolve the foregoing problems, the present invention provides a powder recycling system to greatly reduce attrition of recycling powder and improve the recycle rate of powder to reduce costs and provide a highly automatic system that can run for a long time, reduces manual operation, and is safer.

In an embodiment, the powder recycling system provided in the present invention includes a supply tank, a continuous loss in weight module, a pneumatic module, a transfer channel, a recycle module, and a refilling tank. The supply tank accommodates recycling powder. The continuous loss in weight module includes a storage tank and a rotary output pipe. The storage tank receives the recycling powder. The rotary output pipe is connected to the storage tank to move the recycling powder. The continuous loss in weight module controls, according to the weight change of the storage tank, the mass flow rate of recycling powder at the rotary output pipe. The pneumatic module enables the recycling powder to float and move in the transfer channel. The recycle module is connected to the transfer channel to receive the recycling powder, sieves the recycling powder, provides virgin powder, and then mixes the virgin powder with the recycling powder. The refilling tank is connected to the recycle module to receive the recycling powder and the virgin powder.

In conclusion, the powder recycling system, according to any embodiment of the present invention, is a closed pneumatic conveying system and may avoid stacking of powder in a pipe or collision between the powder and a wall surface of the transfer channel to maintain the roundness of the powder, thereby further maintaining the strength of a workpiece after laser sintering. In the powder recycling system according to any embodiment of the present invention, by means of transfer of powder of a fixed amount and the pneumatic module, the problem when the powder is not evenly transferred during a pneumatic conveying process may be avoided, so that the condition where the mass flow rate of the powder is not fixed may be improved, and the powder is enabled to keep floating in a gas during a transfer process. In the powder recycling system according to an embodiment of the present invention, because of the mass flow rate of powder entering the sieving module is stable, the sieving efficiency may be improved. In the powder recycling system according to an embodiment of the present invention, a protection gas and a closed pipe are used to prevent oxidation of powder and lower the possibility of dust explosion. In the powder recycling system according to an embodiment of the present invention also, an ultrasonic vibration sieve mesh is used to improve the sieving efficiency and prevent the sieve mesh from being blocked. Still in the powder recycling system according to an embodiment of the present invention, the pneumatic module may improve the gas flow field, reduce powder stack, and improve the mixing degree of gas and powder. In the same powder recycling system according to an embodiment of the present invention, a rat hole phenomenon may be avoided and a positive pressure is provided to prevent powder from being jetted inversely. The powder recycling system according to an embodiment of the present invention may be applied to large-scale additive manufacturing, so as to automatically recycle remaining powder and provide powder, thereby reducing requirements for manual operation.

DETAILED DESCRIPTION OF THE INVENTION

Figure 1:
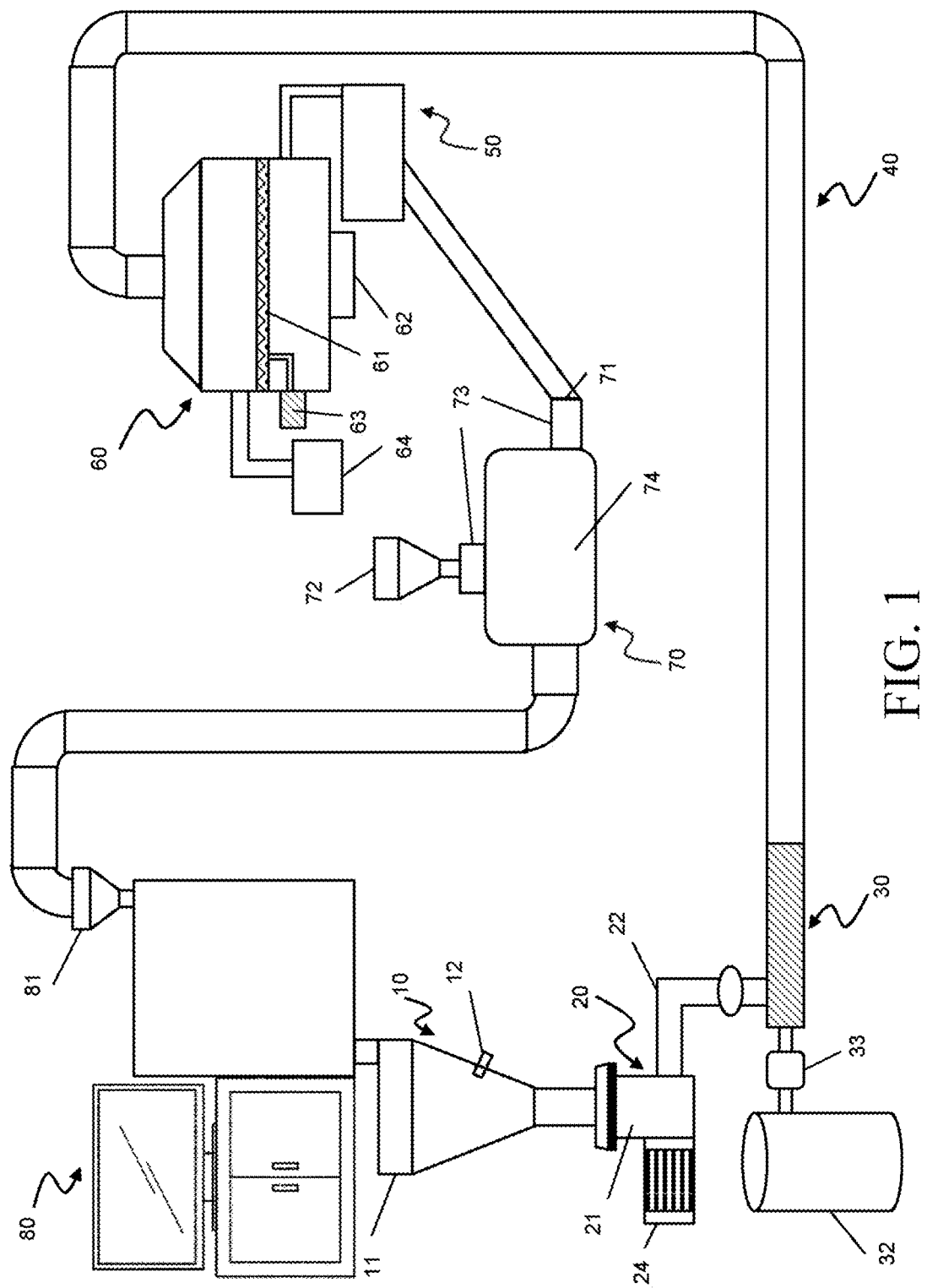
FIG. 1 is a schematic diagram of a powder recycling system according to an embodiment of the present invention.

FIG. 1 is a schematic diagram of a powder recycling system according to an embodiment of the present invention. In this embodiment, the powder recycling system includes a supply tank 10, a continuous loss in weight module 20, a pneumatic module 30, a transfer channel 40, a recycle module, and a refilling tank 81. The powder recycling system in this embodiment of the present invention may be applied to or attached to various industrial manufacturing systems that need to recycle or transfer powder, and particularly, to systems that have high requirements on specifications of recycling powder, such as an additive manufacturing system.

FIG. 2A and FIG. 2B is a side and top view, respectively, of a supply tank according to an embodiment of the present invention. The supply tank 10 accommodates recycling powder. The supply tank 10 receives and temporarily stores remaining recycling powder from a working platform 80 after manufacturing is completed. The supply tank 10 is approximately in a funnel shape, and a wall surface of the supply tank 10 has an angle of inclination, so that the recycling powder falls into a next module by means of the weight of the recycling powder after collecting downward and toward a center. Referring to FIG. 2A, in some embodiments, the supply tank 10 includes a powder outlet funnel cylinder 11 and at least one jet head 12. In some embodiments, the powder outlet funnel cylinder 11 includes a large opening 110, a small opening 112, and a pipe wall 114. The large opening 110 is located on one end of the powder outlet funnel cylinder 11, the small opening 112 is located on the other end of the powder outlet funnel cylinder 11, and the cylinder wall 114 is connected between the large opening 110 and the small opening 112. After the large opening 110 receives the recycling powder, the recycling powder passes through the cylinder wall 114, and then the small opening 112 transfers the recycling powder to the continuous loss in weight module 20. The jet head 12 is disposed on the cylinder wall 114 of the powder outlet funnel cylinder 11, and there is an included angle between the jet head 12 and the cylinder wall 114. The jet head 12 injects gas into the powder outlet funnel pipe 11 to remove recycling powder remaining on the cylinder wall 114 and to enable the supply tank 10 to be in a slight positive pressure state, thereby helping the powder to be smoothly removed and avoiding a case where the recycling powder flows back.

In some embodiments, the included angle between the jet head 12 and the cylinder wall 114 may be in a range of 1 degree to 90 degrees, and this application is not limited thereto. Referring to FIG. 2A, in some embodiments, there may be two jet heads 12, and the two jet heads 12 are disposed on the cylinder wall 114 in a left-right symmetrical manner Referring to FIG. 2B, in some embodiments, there may be four heads 12, and two of the jet heads 12 are disposed symmetrically to the other two of the jet heads 12 on the cylinder wall 114.

Figure 3:
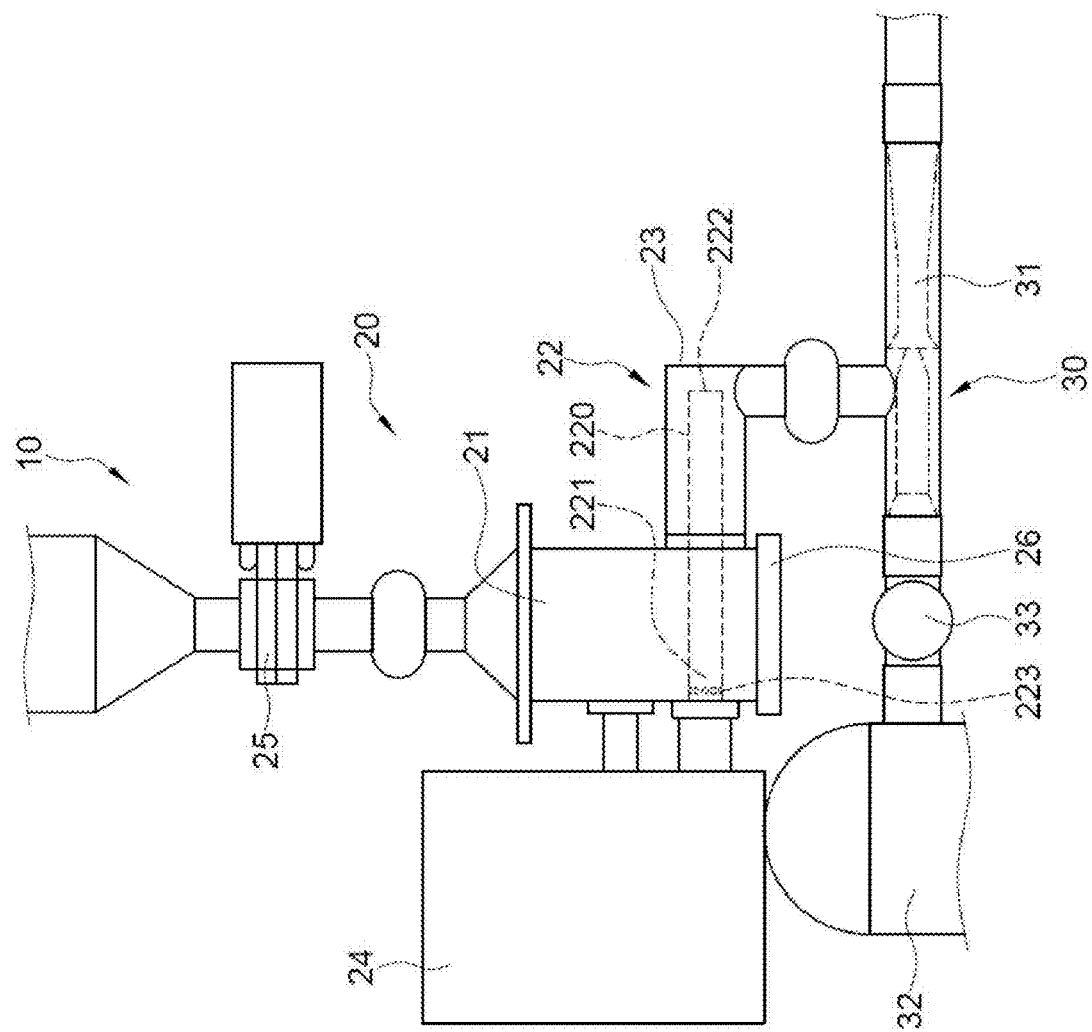
FIG. 3 is a side view of a continuous loss in weight module according to an embodiment of the present invention.

FIG. 3 is a side view of a continuous loss in weight module according to an embodiment of the present invention. Referring to FIG. 1 and FIG. 3, the continuous loss in weight module 20 includes a storage tank 21, a rotary output pipe 22, and a valve 25. The top of the storage tank 21 is connected to the small opening 112 of the supply tank 10. The valve 25 controls the amount of powder discharged by the supply tank 10, so that the storage tank 21 can receive the recycling powder falling from the supply tank 10. One end of the rotary output pipe 22 is connected to the storage tank 21, and the other end of the rotary output pipe 22 is connected to the pneumatic module 30, so that the recycling powder enters the pneumatic module 30 from the storage tank 21 through the rotary output pipe 22. The rotary output pipe 22 rotates by using the center of a pipe diameter as an axis. When the rotary output pipe 22 rotates, the recycling powder in the storage tank 21 is driven to move. After entering the rotary output pipe 22, the recycling powder is driven by the rotary output pipe 22 to move from the storage tank 21 to an outlet end 222 far away from the storage tank 21 of the rotary output pipe 22 to enter the pneumatic module 30. In some embodiments, an inner wall surface of the rotary output pipe 22 may be a smooth plane, to ensure that attrition of the recycling powder is reduced. In some embodiments, the inner wall surface of the rotary output pipe 22 may be provided with inner threads to improve the transfer efficiency. However, addition of the inner threads may increase attrition of powder.

Referring to FIG. 3 again, in some embodiments, the rotary output pipe 22 includes a sealing outer pipe 23 and a rotary inner pipe 220. The sealing outer pipe 23 wraps the rotary inner pipe 220 and the powder inlet 3121 of the pneumatic module 30 in a sealing manner, so that the powder recycling system remains a closed state. The rotary inner pipe 220 includes a connection end 221 and an opening end 222. The connection end 221 is disposed on the outer wall surface, close to the bottom, of the storage tank 21. The opening end 222 is disposed above the powder inlet 312, so that the recycling powder directly falls into the powder inlet 312 from the opening end 222. In some embodiments, the connection end 221 of the rotary inner pipe 220 extends into the storage tank 21. In addition, the rotary inner pipe 220 further includes a plurality of powder feeding pores 223 disposed on a surface, close to the connection end 221, of the rotary inner pipe 220. The recycling powder enters the rotary output pipe 22 through the plurality of powder feeding pores 223 on the surface of the rotary inner pipe 220. In some embodiments, a pipe wall of the rotary inner pipe 220 is parallel to a bottom surface of the storage tank 21. In some other embodiments, the rotary inner pipe 220 may have an angle of inclination (for example, the connection end 221 of the rotary inner pipe 220 is higher than the opening end 222) to increase the falling rate of the recycling powder. In some embodiments, the rotary output pipe 22 further includes a rotating motor 24. The rotary inner pipe 220 is connected to the rotating motor 24. The rotating motor 24 drives the rotary inner pipe 220 to rotate.

In some embodiments, the continuous loss in weight module 20 controls, according to the weight change of the storage tank 21, the output mass flow rate of the recycling powder by the rotary output pipe 22. The mass flow rate is the mass of recycling powder flowing into or out of a channel per unit time when the recycling powder flows in the channel. A common unit is kilogram/second (kg/s). That is, the weight by which the weight of the storage tank 21 reduces per second is measured and used as the mass flow rate of entering the pneumatic module 30. In some embodiments, the continuous loss in weight module 20 controls the rotating speed of the rotary output pipe 22 according to the weight change of the storage tank 21 to adjust the amount of the recycling powder output from the opening end 222 and to adjust the mass flow rate of the recycling powder. In some embodiments, the continuous loss in weight module further includes a valve 25 and a weight sensing element 26. The valve 25 is disposed between the supply tank 10 and the storage tank 21. The weight sensing element 26 is disposed below the storage tank 21. When the valve 25 is opened, the recycling powder falls into the storage tank 21 from the supply tank 10. In some embodiments, the valve 25 is a butterfly valve, or referred to as a flap valve, and controls, by opening different angles by means of flapping, the amount of the recycling powder falling into the storage tank 21. In addition, the butterfly valve has a simple structure, a small volume, low weight, and a low opening or closing torque that can be rapidly opened or closed. Moreover, when the recycling powder passes the butterfly valve, the resistance imposed on the recycling powder is relatively low and the pressure drop is also relatively small.

In some embodiments, when the valve 25 is opened, the weight sensing element 26 stops detecting; and when the valve 25 is closed, the weight sensing element starts detecting, so that the weight sensing element can obtain a more accurate detection result. In some embodiments, the weight sensing element detects the total weight of the storage tank 21 and the recycling powder, and records the change amount of the total weight over time. In some embodiments, the weight sensing element detects the total weight of the storage tank 21, the rotary output pipe 22, and the recycling powder, and records the change amount of the total weight over time. In some embodiments, the weight sensing element is a high-precision weight sensing element, and the detection precision thereof may reach 0.1 g/s.

In some embodiments, the continuous loss in weight module includes a processing unit (not shown in the figure), a weight sensing element 26, and a rotating motor 24 electrically connected to the processing unit. The processing unit receives the weight change of the storage tank 21 and adjusts the rotating speed of the rotary output pipe 22 by using the rotating motor 24. In some embodiments, the valve 25 is electrically connected to the processing unit, and the processing unit receives the detected weight of the storage tank 21 to control the valve 25 to be opened or closed. For example, when the recycling powder accommodated by the storage tank 21 is of specified lowest weight (for example, 20% of the volume of the storage tank 21), the valve 25 is opened; and when the recycling powder accommodated by the storage tank 21 is of specified highest weight (for example, 90% of the volume of the storage tank 21), the valve 25 is closed. In some embodiments, when the valve 25 is opened, the recycling powder starts to continuously fall into the storage tank 21. At the moment, the continuous loss in weight module 20 stops controlling the rotating speed of the rotary output pipe 22 according to the weight change of the storage tank 21, and only maintains the rotating speed before the valve 25 is opened. That is, when the valve 25 is closed, the weight of the recycling powder in the storage tank 21 stops changing, and therefore the continuous loss in weight module 20 starts to control the rotating speed of the rotary output pipe 22 according to the weight change of the storage tank 21. In some embodiments, when detecting excessive reduction per unit time (for example, per second) of the total weight of the storage tank 21 and the recycling powder, the weight sensing element 26 feeds back that the rotating speed of the rotary output pipe 22 needs to be controlled and reduced; and when detecting excessively little reduction per unit time of the total weight of the storage tank 21 and the recycling powder, the weight sensing element feeds back that the rotating speed of the rotary output pipe 22 needs to be controlled and increased, so as to control the weight of the recycling powder falling into the pneumatic module per unit time more precisely.

Figure 4A:
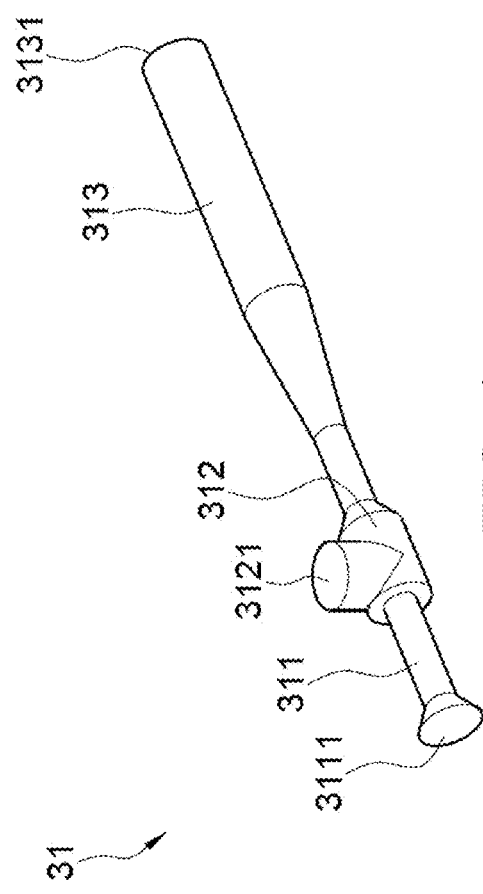
FIG. 4A is a three-dimensional view of a pneumatic module according to an embodiment of the present invention.
Figure 4B:
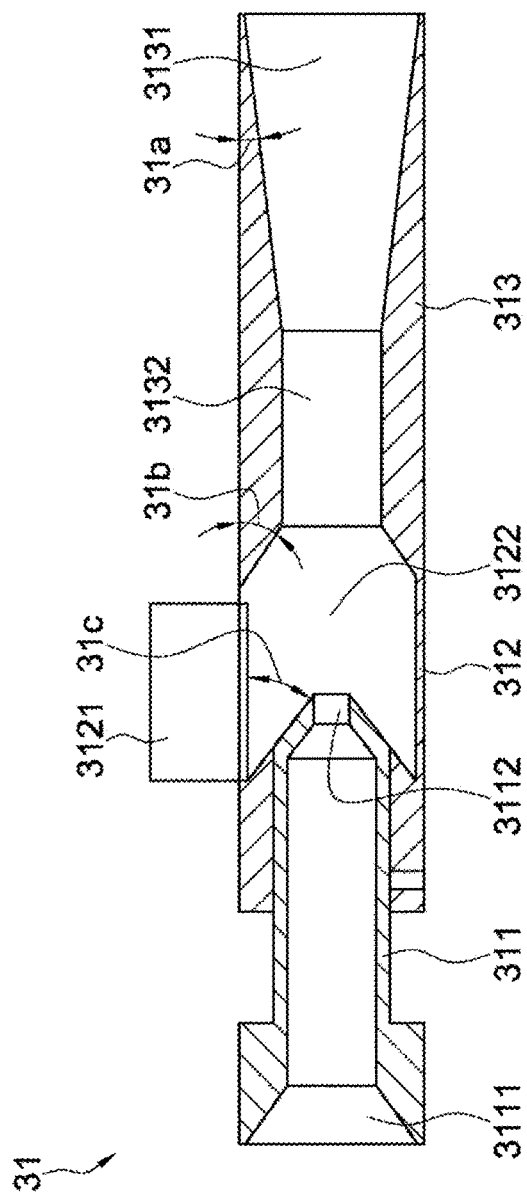
FIG. 4B is a sectional view of a pneumatic module according to an embodiment of the present invention.

FIG. 4A is a three-dimensional view of a pneumatic module according to an embodiment of the present invention. FIG. 4B is a sectional view of the pneumatic module according to this embodiment of the present invention. In some embodiments, the pneumatic module 30 enables the recycling powder to float and move, and the pneumatic module 30 provides a protection gas for mixing with the recycling powder to avoid lowering of the quality of the recycling powder due to oxidation of the recycling powder. In some embodiments, the transfer channel 40 is connected to the pneumatic module 30, and the recycling powder floats and moves in the transfer channel, so that the recycling powder is transferred to a recycling powder storage tank 50 through the transfer channel 40. In some embodiments, the protection gas includes an inert gas and a gas with relatively low activity. In some other embodiments, the protection gas provided by the pneumatic module 20 may be adjusted according to the type of the recycling powder. For example, nitrogen is used for inconel alloy powder, and argon is used for titanium alloy powder.

Figure 2:
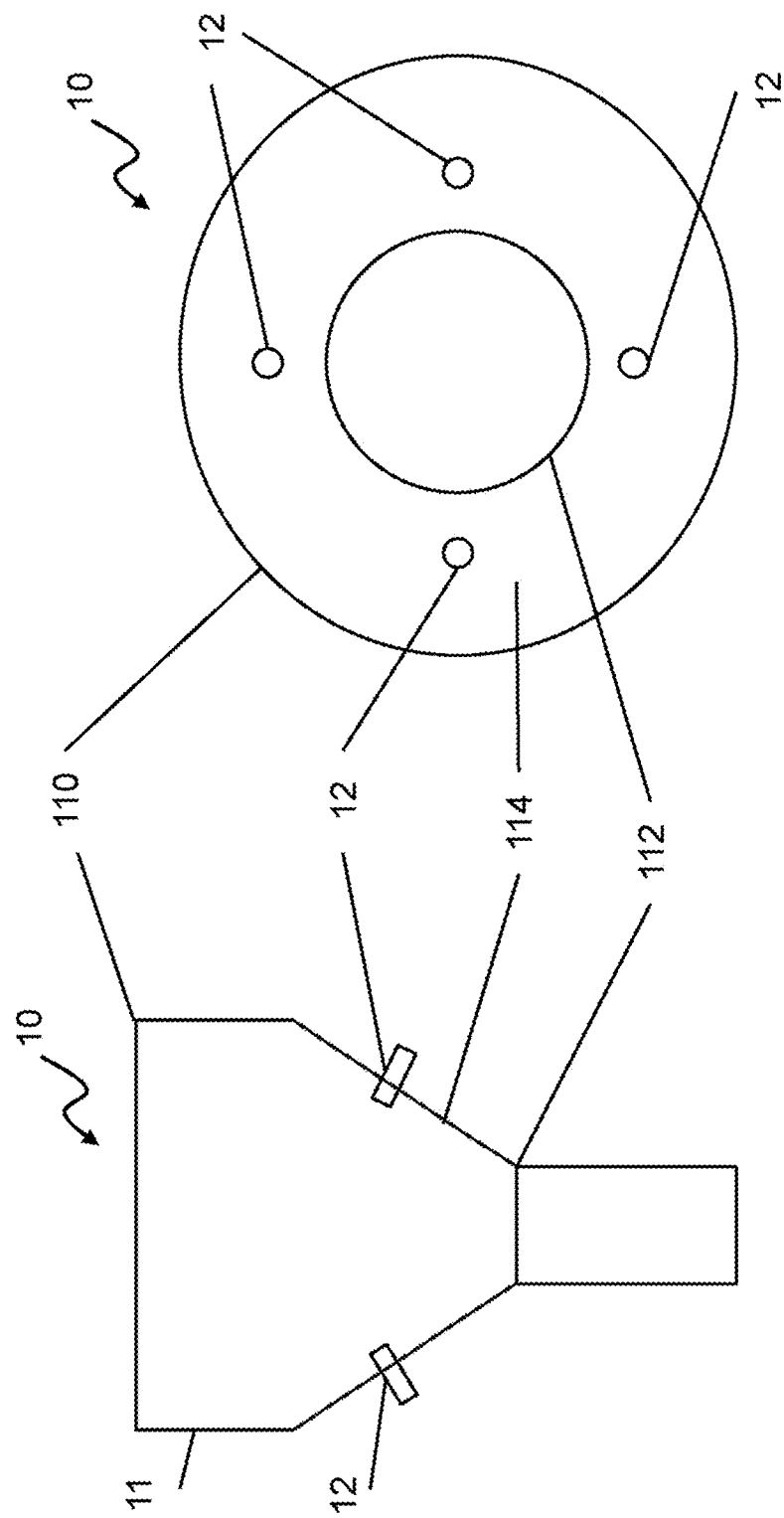
FIG. 2A is a side view of a supply tank according to an embodiment of the present invention.
FIG. 2B is a top view of a supply tank according to an embodiment of the present invention.

Referring to FIG. 2, FIG. 4A, and FIG. 4B again, in some embodiments, the pneumatic module 30 includes a Venturi powder ejector 31 and a gas supply apparatus 32. In some embodiments, the Venturi powder ejector 31 includes a gas inlet section 311, a powder feeding section 312, and a Venturi tube 313. A gas inlet 3111 and a nozzle 3112 are separately disposed on two ends of the gas inlet section 311. The gas inlet 3111 is connected to the gas supply apparatus 32. The nozzle 3112 is connected to the powder feeding section 312. Because of the static pressure formed by the nozzle 3112 decreases, a powder suction chamber 3122 with a negative pressure is formed in the powder feeding section 312. That is, the powder suction chamber 3122 is a negative pressure region. Therefore, the recycling powder may be inhaled in through the powder inlet 3121 more efficiently. The powder inlet 3121 is located above the powder suction chamber 3122 and is connected to the rotary output pipe 22, and is configured to receive the recycling powder output from the storage tank 21. One end of the Venturi tube 313 is connected to the powder suction chamber 3122 of the powder feeding section 312, and the other end of the Venturi tube 313 is connected to the transfer channel 40. The gas supply apparatus 32 provides a protection gas by means of the gas inlet 3111 and blows the protection gas into the powder suction chamber 3122 by means of the nozzle 3112. The recycling powder enters the powder inlet 3121 from the rotary output pipe 22. The recycling powder is mixed with the protection gas in the powder suction chamber 3122, so that the recycling powder floats and moves in the protection gas, passes through the Venturi tube 313, and is output to the transfer channel 40 through the powder outlet 3131 of the Venturi tube 313. In some embodiments, the distance from the powder inlet 3121 to the gas inlet 3111 is less than the distance from the powder inlet 3121 to the powder outlet 3131. In some embodiments, the inner diameter of the powder feeding section 312 is greater than that of the gas inlet section 311 and that of the Venturi tube 313. In some embodiments, the inner diameter of the nozzle 3112 is less than that of the gas inlet 3111. In some embodiments, the inner diameter of the gas inlet section 311 gradually decreases from the gas inlet 3111 to the nozzle 3112. By means of high-speed fluctuation of the protection gas, the recycling powder and the protection gas are forcibly and evenly mixed in the Venturi tube, thereby alleviating recycling powder deposition, and reducing attrition caused on the recycling powder. In some embodiments, the pneumatic module 30 further includes a flow control element 33 to control the rate of outputting the protection gas.

Figure 5A:
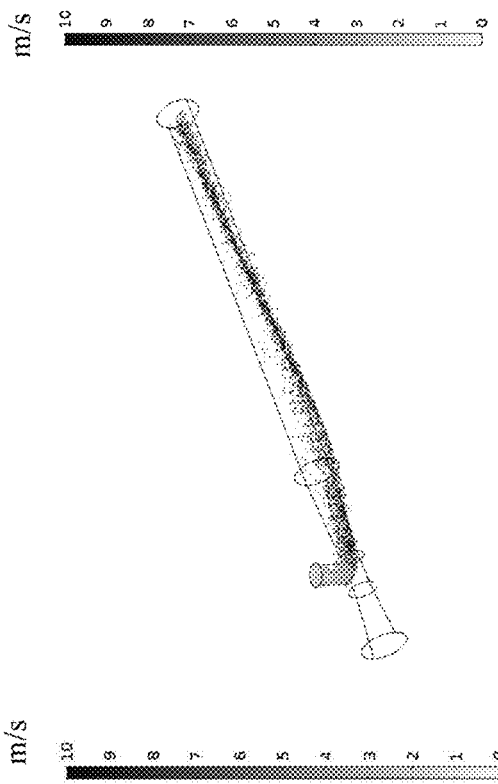
FIG. 5A is a diagram of a testing result of the gas flow field speed of a conventional powder conveyor.
Figure 5B:
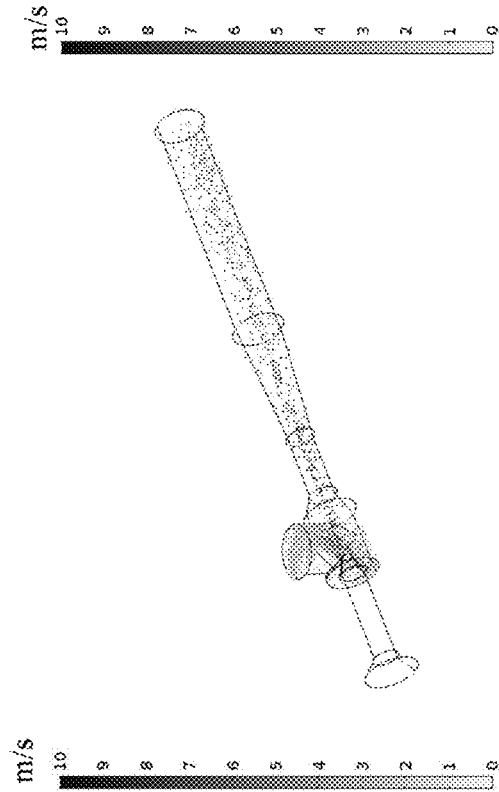
FIG. 5B is a diagram of a testing result of the gas flow field speed of a Venturi powder ejector according to an embodiment of the present invention.
Figure 5C:
FIG. 5C is a diagram of a testing result of a powder trajectory of a conventional powder conveyor.
Figure 5D:
FIG. 5D is a diagram of a testing result of a powder trajectory of a Venturi powder ejector according to an embodiment of the present invention.

FIG. 5A is a diagram of a testing result of the gas flow field speed of a conventional powder conveyor. FIG. 5B is a diagram of a testing result of the gas flow field speed of a Venturi powder ejector according to an embodiment of the present invention. FIG. 5C is a diagram of a testing result of a powder trajectory of the conventional powder conveyor. FIG. 5D is a diagram of a testing result of a powder trajectory of the Venturi powder ejector according to this embodiment of the present invention. Referring to FIG. 4B and FIG. 5 again, in some embodiments, a powder feeding angle 31b of the Venturi tube 313 may be 25 degrees to 35 degrees, and preferably, may be 27.5 degrees. A powder outlet angle 31a of the Venturi tube 313 may be 1 degree to 7 degrees, and preferably, may be 5.0 degrees. In some embodiments, the Venturi tube 313 includes a throat throat 3132. The smallest inner diameter of the throat 3132 may be 28 mm, and the inner diameter of the powder outlet of the Venturi tube 313 is greater than 28 mm. In some embodiments, a length of the throat of the Venturi tube 313 may be 65 mm. In some embodiments, the largest inner diameter of the gas inlet section 311 of the Venturi powder ejector 31 may be 25 mm. In some embodiments, the inner diameter of the powder inlet 3121 of the Venturi powder ejector 31 may be 50 mm. In some embodiments, an included angle 31c between the powder inlet 3121 of the Venturi powder ejector 31 and an outer tube wall, close to the nozzle 3112, of the gas inlet section 311 is 30.0 degrees. In an example, measurement of the gas flow field status and the powder distribution status of the Venturi powder ejector 31 manufactured according to the foregoing angles and sizes is shown in FIG. 5A to 5D. FIG. 5A is a diagram of the gas flow field status of the conventional powder conveyor. According to the status of uneven color gradation in the figure, it can be learned that the gas flow field is of low evenness. FIG. 5B is a diagram of the gas flow field status of an exemplary Venturi powder ejector 31. Color gradation is even in the figure, and particularly, a narrowest throat has a deep color and a status of even color gradation. Therefore, the gas flow field of the Venturi powder ejector 31 is of high evenness and has a high flow speed. FIG. 5C is a diagram of the powder distribution status of the conventional powder conveyor. It can be learned from the figure that powder distribution is uneven, and most powder stack at the bottom of a tube. FIG. 5D is a diagram of the powder distribution status of the exemplary Venturi powder ejector 31. It can be learned that powder distribute evenly in an entire tube. By means of angle and tube length adjustment, the evenness of a protection gas flow field may be improved, and the mixing degree of the recycling powder and the protection gas may be improved.

In some embodiments, the powder recycling system includes a powder sieving module 60. The powder sieving module 60 is disposed between the transfer channel 40 and the refilling tank 81, this receives the recycling powder from the transfer channel 40, and sieves the recycling powder into at least two types according to a sieving standard. In some embodiments, the sieving standard may be 63 µm. For example, recycling powder that corresponds to the sieving standard (that is, less than 63 µm) enters the recycling powder storage tank 50 for recycle, and recycling powder that does not correspond to the sieving standard departs from the powder recycling system through another channel.

Referring to FIG. 1 again, in some embodiments, the recycle module includes a sieving module 60. The sieving module 60 includes a sieve mesh 61, a vibration apparatus 62, an ultrasonic vibration apparatus 63, and a discarded powder storage tank 64. In some embodiments, the vibration apparatus 62 is located below the sieving module 60. The vibration apparatus 62 may effectively sieve the recycling powder by means of vibration provided by a vibrating motor. In some other embodiments, the ultrasonic vibration apparatus 63 is connected to the sieve mesh 61, so that the sieve mesh 61 generates an ultrasonic vibration frequency, thereby further increasing the sieving efficiency. A part of the recycling powder received by the transfer channel 40 enters the recycling powder storage tank 50 through the sieve mesh 61, and another part of the recycling powder does not pass through the sieve mesh 61 and enters the discarded powder storage tank 64. In some embodiments, because the powder recycling system may transfer recycling powder with fine powder (for example, the recycling powder has a powder diameter between 10 µm and 80 µm), there may be cases where powder is stuck in the sieve mesh 61 and pores of the sieve mesh 61 are blocked, and so on. By means of the sieve mesh 61 with ultrasonic vibration, the sieve mesh 61 may be prevented from being blocked, and the sieving efficiency may be increased.

In some embodiments, the powder recycling system includes a gas exhaust module. The gas exhaust module includes a filter and a pulse jet apparatus that is configured to periodically remove powder stuck in the filter by means of high pressure gas pulses. In some embodiments, the filter is a twisted filter, to increase the filter area. In some embodiments, the filter mesh size is 5 µm.

In some embodiments, the powder recycling system includes a recycle module. The recycle module includes a mixing module 70. The mixing module 70 includes a recycling powder inlet 71, a virgin powder inlet 72, a weighing apparatus 73, and a mixing apparatus 74. The recycling powder inlet 71 is disposed between the recycling powder storage tank 50 and the weighing apparatus 73. Recycling powder that is stored in the recycling powder storage tank 50 and that corresponds to the sieving standard enters the weighing apparatus 73 through the recycling powder inlet 71. The weighing apparatus 73 is connected to the mixing apparatus 74. The weighing apparatus 73 is configured to extract recycling powder of proper weight. The virgin powder inlet 72 is connected to the mixing apparatus 74, so as to add virgin powder of a proper amount into the mixing apparatus. In some embodiments, another weighing apparatus 73 may be disposed between the virgin powder inlet 72 and the mixing apparatus 74. The mixing apparatus is configured to: fully mix the recycling powder with the virgin powder, and provide mixed powder for recycle. Because recycling powder of different batches does not necessarily have same bulk density, conventional proportioning control according to the volume is not precise. Proportioning control by using a weighing apparatus may improve precision of the ratio of the virgin powder to the recycling powder for each time. In some embodiments, the ratio of the recycling powder to the virgin powder may be 1:1.

Although the present invention has been described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of the appended claims should not be limited to the description of the preferred embodiments described above.

What is claimed is:

1. A powder recycling system, comprising:
   a supply tank, configured to accommodate recycling powder;
   a continuous loss in weight module, comprising a storage tank and a rotary output pipe, wherein the storage tank receives the recycling powder, the rotary output pipe is connected to the storage tank to output the recycling powder, and the continuous loss in weight module controls, according to the weight change of the storage tank, the mass flow rate of outputting, by the rotary output pipe, the recycling powder;
   a pneumatic module, configured to enable the recycling powder to float and move;
   a transfer channel, connected to the pneumatic module, wherein the recycling powder floats and moves in the transfer channel;
   a recycle module, connected to the transfer channel to receive the recycling powder, and configured to: sieve the recycling powder, provide virgin powder, and then mix the virgin powder with the recycling powder; and
   a refilling tank, connected to the recycle module to receive the recycling powder and the virgin powder;
   wherein the continuous loss in weight module further comprises a valve and a weight sensing element, the valve is disposed between the supply tank and the storage tank, the rotary output pipe is connected to the bottom of the storage tank, and the weight sensing element measures the weight change of the storage tank, to control the rotating speed of the rotary output pipe.

2. The powder recycling system according to claim 1, wherein the weight sensing element measures the weight change of the storage tank to control the valve to be opened or closed.

3. The powder recycling system according to claim 1, wherein the pneumatic module comprises a Venturi powder ejector and a gas supply apparatus; the Venturi powder ejector comprises a gas inlet section, a powder feeding section, and a Venturi tube; the powder feeding section is disposed between the gas inlet section and the Venturi tube; the gas inlet section is connected to the gas supply apparatus; the powder feeding section is connected to the rotary output pipe; the Venturi tube is connected to the transfer channel; the gas supply apparatus provides a protection gas by means of a gas inlet of the gas inlet section; and the recycling powder enters the powder feeding section from the rotary output pipe, so that the recycling powder floats and moves in the protection gas and is output from a powder outlet of the Venturi tube.

4. The powder recycling system according to claim 3, wherein a powder feeding angle of the Venturi powder ejector is 25 degrees to 35 degrees, and a powder outlet angle of the Venturi tube is 1 degree to 7 degrees.

5. The powder recycling system according to claim 4, wherein the powder feeding angle of the Venturi powder ejector is 27.5 degrees, and the powder outlet angle of the Venturi tube is 5 degrees.

6. The powder recycling system according to claim 1, wherein the rotary output pipe comprises a sealing outer pipe and a rotary inner pipe, the sealing outer pipe wraps the rotary inner pipe and the powder inlet, the rotary inner pipe comprises a connection end and an opening end, the connection end is connected to the bottom of the storage tank, and the opening end is disposed above the powder inlet.

7. The powder recycling system according to claim 6, wherein the rotary inner pipe comprises a plurality of powder feeding pores, a connection end, and an opening end, the connection end is located in the storage tank, and the powder feeding pores are disposed on a surface, close to the connection end, of the rotary inner pipe.

8. The powder recycling system according to claim 1, wherein the supply tank comprises a powder outlet funnel cylinder and at least one jet head, the jet head is disposed on a cylinder wall of the powder outlet funnel cylinder, and there is an included angle between the jet head and the cylinder wall.

9. The powder recycling system according to claim 8, wherein there are four jet heads.

10. The powder recycling system according to claim 1, wherein the recycle module comprises a sieving module, and the sieving module receives the recycling powder by means of the transfer channel, and sieves the recycling powder into at least two types according to a sieving standard.

11. The powder recycling system according to claim 10, wherein the sieving module comprises a sieve mesh, a vibration apparatus, an ultrasonic vibration apparatus, and a discarded powder storage tank, the vibration apparatus and the ultrasonic vibration apparatus are connected to the sieve mesh, a part of the recycling powder received by the transfer channel enters a recycling powder storage tank through the sieve mesh, and another part of the recycling powder does not pass through the sieve mesh and enters the discarded powder storage tank.

12. The powder recycling system according to claim 11, wherein the recycle module further comprises a mixing module, and the mixing module is connected to the recycling powder storage tank to receive the recycling powder, and mixes the virgin powder with the recycling powder.

13. The powder recycling system according to claim 12, wherein the mixing module comprises a recycling powder inlet, a virgin powder inlet, a weighing apparatus, and a mixing apparatus, the recycling powder inlet is connected to the recycling powder storage tank and the weighing apparatus, the weighing apparatus is connected to the mixing apparatus, and the virgin powder inlet is connected to the mixing apparatus.

* * * * *